United States Patent
Fujita et al.

(10) Patent No.: US 7,833,609 B2
(45) Date of Patent: Nov. 16, 2010

(54) MULTI-LAYER SLIDING MEMBER, AND METHOD FOR FORMING COATING LAYER OF SLIDING MEMBER

(75) Inventors: Masahito Fujita, Inuyama (JP); Hideo Tsuji, Inuyama (JP); Shinji Ochi, Inuyama (JP); Manabu Izumida, Inuyama (JP)

(73) Assignee: Daido Metal Co., Ltd., Nagoya (JP)

( * ) Notice: Subject to any disclaimer, the term of this patent is extended or adjusted under 35 U.S.C. 154(b) by 815 days.

(21) Appl. No.: 11/603,010

(22) Filed: Nov. 22, 2006

(65) Prior Publication Data
US 2007/0116936 A1    May 24, 2007

(30) Foreign Application Priority Data
Nov. 22, 2005    (JP) .............................. 2005-337098

(51) Int. Cl.
*B32B 1/00*    (2006.01)
*B32B 3/00*    (2006.01)
*B32B 5/16*    (2006.01)
*F16C 19/00*   (2006.01)
*C10M 169/04*  (2006.01)
*C10M 111/04*  (2006.01)
*C10M 169/00*  (2006.01)
*C01G 39/06*   (2006.01)
*B05D 1/12*    (2006.01)
*B05D 3/00*    (2006.01)

(52) U.S. Cl. ........................ 428/174; 428/156; 428/323; 428/328; 384/322; 384/462; 384/463; 384/907; 384/910; 508/113; 508/155; 508/167; 427/180; 427/189; 427/190

(58) Field of Classification Search ................. 428/156, 428/167, 323, 328, 174; 384/462, 463, 910, 384/907, 322; 508/113, 155, 167; 427/180, 427/189, 190
See application file for complete search history.

(56) References Cited

U.S. PATENT DOCUMENTS
3,632,368 A    1/1972   Nelson
6,815,400 B2 * 11/2004  Jee et al. ..................... 508/113
2002/0141671 A1 * 10/2002  Narkon et al. ............... 384/322

FOREIGN PATENT DOCUMENTS
JP    9079262       3/1997
JP    11106779      4/1999
JP    11131257      5/1999
JP    2002339083    11/2002
JP    4083914       3/2003

* cited by examiner

*Primary Examiner*—David R Sample
*Assistant Examiner*—Catherine Simone
(74) *Attorney, Agent, or Firm*—Browdy and Neimark, PLLC

(57) ABSTRACT

The present invention is intended to provide a sliding member which exhibits an excellent anti-seizure property even under starved lubricant conditions. In the present invention, there is provided a sliding member with a structure, in which a coating layer having a sliding surface is adhered to the surface of the base material, wherein the coating layer does not contain a resin binder but has solid lubricant plate crystal particles laminated therein, wherein these solid lubricant plate crystal particles have a lamellar crystal structure in which (001) planes are stacked in parallel, and at least in the sliding surface, the orientation index of the (001) plane of the solid lubricant plate crystal particles is 90% or more.

18 Claims, 7 Drawing Sheets

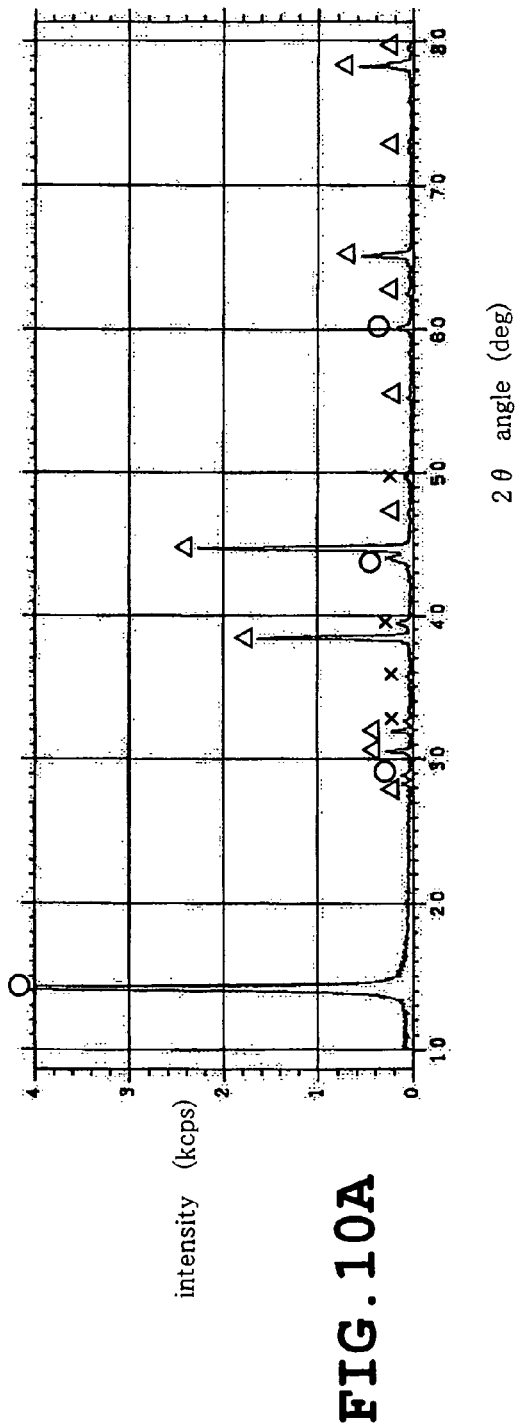
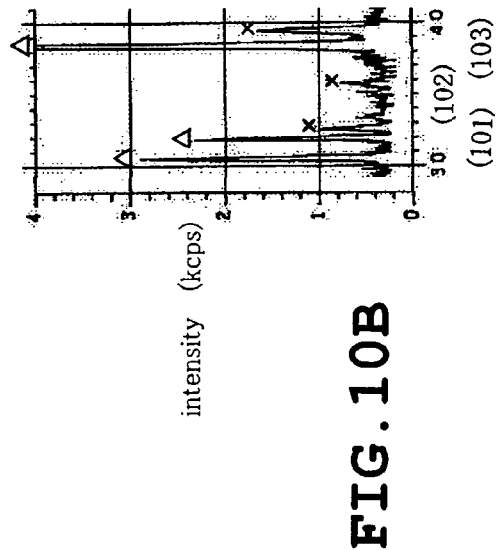
FIG.10A
FIG.10B

MULTI-LAYER SLIDING MEMBER, AND METHOD FOR FORMING COATING LAYER OF SLIDING MEMBER

BACKGROUND OF THE INVENTION

The present invention relates to a sliding member formed by adhering a coating layer composed of solid lubricant plate crystal particles to the surface of a base material, and a method for forming the coating layer.

In the slide bearing (sliding member) of an automotive engine, generally, an aluminum-base bearing alloy and a copper-base bearing alloy are used as the sliding layer. In recent years, while advances have been made which permit higher output power and higher rotational speed in automotive engines, the demand for improvement of fuel efficiency is high, and there is therefore a need for a low friction characteristic in the slide bearing. In particular, in vehicles, like a hybrid car, where frequent starting and stopping of an engine are repeated, a low friction characteristic under boundary lubricant conditions is required.

In order to address the demand for a low friction characteristic under boundary lubricant conditions, reforming the surface of a slide bearing by using a solid lubricant is effective. As to the reforming of the surface of a bearing by means of a solid lubricant, there are known a technique (Patent Documents 1 to 3), in which solid lubricant particles are mixed with a resin binder and then coated onto the surface of the slide bearing and cured, and a technique (Patent Documents 4 to 6) in which by applying a technique, such as shot peening or shot blasting, solid lubricant particles are collided against the surface of the slide bearing and adhered to the surface of the slide bearing by the collision energy.

The Patent Document 1 describes a slide bearing material wherein a coating layer composed of a solid lubricant of 55 to 90 mass % and a polyimide resin binder of 45 to 10 mass % is formed in the surface of an aluminum-base bearing alloy, and states that this coating layer improves the initial compatibility of the aluminum-base bearing alloy, and thus an excellent fatigue resistance and an excellent anti-seizure property are obtained. Patent Document 2 describes that a coating layer composed of a solid lubricant of 30 to 90 mass % and a resin binder of 70 to 10 mass % is formed in the surface of a copper system bearing alloy, thereby attaining improvement in fatigue resistance, wear resistance, and anti-seizure property. Moreover, Patent Document 3 describes that a coating layer composed of a solid lubricant of 30 to 70 mass % and a resin binder of 70 to 30 mass % is formed in the surface of a bearing base material, thereby obtaining an excellent wear resistance and an excellent sliding characteristic.

On the other hand, Patent Document 4 describes a lubricant coated bearing wherein solid lubricant particles are collided against the surface of a bearing with a sufficient energy by the same method as that of sand blasting, thereby forming a film in the thickness of 75 to 100 µm. Patent Document 5 describes that solid lubricant particles are injected onto the surface of a sliding portion composed of metal or ceramics at an injection velocity of 80 m/s or more, or at an injection pressure of 0.3 MPa or more, thereby diffusing and infiltrating the elements in the composition of the lubricant particle and forming a wear resistant film. Moreover, Patent Document 6 describes molybdenum disulfide with a purity of 95% or more and the mean particle diameter of 1 µm to 20 µm is collided against a piston of an engine, a cylinder bore, or the like at an injection velocity of 100 m/S or more, thereby forming a film, and states that an excellent lowering effect of the coefficient of friction is obtained due to this film.

Patent Document 1 JP-A-4-83914
Patent Document 2 JP-A-9-79262
Patent Document 3 JP-A-11-106779
Patent Document 4 U.S. Pat. No. 3,632,368
Patent Document 5 Japanese Patent No. 3,357,586
Patent Document 6 JP-A-2002-339083

As described above, techniques of fixing a solid lubricant to the surface of a base material of a sliding member include a technique of mixing solid lubricant particles with a resin binder and coating, and a technique of colliding solid lubricant particles against the surface of a base material and adhering.

However, because the one formed by coating uses a resin binder, the heat conductivity of the coating layer is low and the frictional heat generated by the slide of the counter member is hard to escape to the housing side, resulting in a low heat conduction. This causes a problem that seizure is likely to occur especially under starved lubricant conditions.

In the technique of forming a coating layer composed of a solid lubricant by colliding solid lubricant particles against the surface of a base material, the surface of the base material is hardened by crash impact of the solid lubricant particles, thereby inviting a decrease in compatibility and lowering the anti-seizure property. If attempting to maintain a soft surface state of the base material, the collision velocity of solid lubricant particles needs to be reduced, which would however worsen the adherability of the solid lubricant particles, and as a result, a required thickness is not obtained and a sufficient anti-seizure property cannot be obtained.

As described above, conventionally, when reforming the surface of the base material of a sliding member by means of a solid lubricant, a poor thermal conductive resin binder is used or a strain hardening of the surface of the base material is involved, which is problematic since it is difficult to obtain a sufficient anti-seizure property.

The present invention has been made in view of the above situation, and it is a first object of the present invention to provide a sliding member for reforming the surface of a base material by using a solid lubricant, the sliding member capable of obtaining an excellent anti-seizure property even under starved lubricant conditions, and it is a second object of the present invention to provide a method for forming a coating layer of a sliding member, the method capable of forming a coating layer composed of a solid lubricant in the surface of the base material without applying a resin binder to the surface of the base material of the sliding member and moreover without strain hardening the surface of the base material.

Molybdenum disulfide, graphite, tungsten disulfide, and boron nitride are often used as the solid lubricant. These have a form of a plate crystal particle, and the plate crystal particle has a lamellar crystal structure in which layers whose largest plane is primarily the (001) plane in Miller index are stacked in parallel. For example, the plate crystal particle of molybdenum disulfide has a structure in which the layers of $MoS_2$ molecules connected in the direction parallel to the x-y plane are stacked in the z axis, as shown in FIG. 5, and only a weak van der Waals force is acting between adjoining layers 10 and 12.

If a plate crystal particle of such lamellar crystal structure is present as the solid lubricant in the coating layer of a sliding member, and a shearing force acts between layers in the plate crystal particles along with the movement of the counter member, it will overcome the van der Waals force easily, causing a slide between the layers. This slide between the layers is specific to the material with a lamellar crystal structure, and the coefficient of friction is extremely low. This is a mechanism by which the sliding member has a low friction when plate crystal particles are used as the solid lubricant.

Because the mechanism of a low friction characteristic of the solid lubricant plate crystal particles having a lamellar crystal structure is the one described above, the present inventor predicted that if a plane between layers in the solid lubricant plate crystal particles forming the coating layer is in parallel with the moving direction of the counter member, i.e., in parallel with the surface of the coating layer, a further low friction may be achieved, and has thus made the present invention.

SUMMARY OF THE INVENTION

The present invention provides a sliding member formed by adhering a coating layer to a base material, and methods for forming the coating layer of the sliding member as summarized below.

(1) A sliding member in which a coating layer having a sliding surface is adhered to the surface of a base material,
   wherein the coating layer does not contain a resin binder but has a solid lubricant plate crystal particle laminated therein,
   wherein the solid lubricant plate crystal particle has a lamellar crystal structure in which a (001) plane (where, 1 is an integer of one or more) is stacked in parallel, and
   wherein at least in the sliding surface, the orientation index of the (001) plane of the solid lubricant plate crystal particle is 90% or more.

(2) The sliding member according to (1), wherein in the coating layer, locations in which the orientation index of the (001) plane is 90% or more are the sliding surface and a predetermined region having a thickness of 10% or more of the thickness of the thinnest portion of the coating layer.

(3) The sliding member according to (1), wherein in the coating layer, the location in which the orientation index of the (001) plane is 90% or more is from the sliding surface to the depth of the amount of thickness of the thinnest portion of the coating layer.

(4) The sliding member according to (1), wherein in the coating layer, the (001) plane varies the direction gradually from the direction parallel to the surface of the base material to the direction parallel to the sliding surface, from the surface of the base material to around the sliding surface in the thickness direction of the coating layer, and the orientation index of the (001) plane of the solid lubricant plate crystal particle in the sliding surface as well as of the solid lubricant plate crystal particle adhered to the surface of the base material is 90% or more.

(5) The sliding member according to any one of (1) to (4), wherein the orientation index is 95 to 100%.

(6) The sliding member according to any one of (1) to (5), wherein in the surface of the base material, a concave portion is formed, and also in this concave portion the solid lubricant plate crystal particle is present, and the orientation index of the (001) plane of the solid lubricant plate crystal particle contacting with this concave portion is 90% or more.

(7) The sliding member according to (6), wherein the concave portion is a groove with a gradient of 30° or less in the sliding direction.

(8) The sliding member according to (7), wherein the groove with a gradient of 30° or less in the sliding direction has periodicity in the direction perpendicular to the sliding direction.

(9) The sliding member according to any one of (1) to (8), wherein the coating layer is 0.1 µm or more in the thinnest portion of the coating layer.

(10) The sliding member according to any one of (1) to (9), wherein the solid lubricant plate crystal particle is composed of any one or more kinds among plate crystal particles of molybdenum disulfide, of graphite, of tungsten disulfide, and of boron nitride.

(11) The sliding member according to any one of (1) to (10), wherein the shape of the base material is cylindrical or semicylindrical, a coating portion is adhered to the inner surface of the base material, and the inner surface of the coating portion is a sliding surface.

(12) A method for forming a coating layer of a sliding member, the method for adhering the coating layer having a sliding surface to the surface of a base material,
   wherein to a medium for adhesion, a plurality of solid lubricant plate crystal particles having a lamellar crystal structure in which the (001) planes are stacked in parallel are adhered freely without using a resin binder,
   wherein by sliding this medium for adhesion, to which the plurality of the solid lubricant plate crystal particles have been adhered freely, on the surface of the base material without using a resin binder while applying a pressure to the surface of the base material, the solid lubricant plate crystal particles are adhered to the surface of the base material while being rubbed, and
   wherein further by sliding the medium for adhesion on the surface of the solid lubricant plate crystal particles without using a resin binder while applying a pressure to the surface of the solid lubricant plate crystal particles which have been adhered to the surface of the base material, the solid lubricant plate crystal particles are further adhered and laminated onto the surface of these solid lubricant plate crystal particles while being rubbed.

(13) A method for forming a coating layer of a sliding member, the method for adhering the coating layer having a sliding surface to the surface of a base material,
   wherein to a medium for adhesion, a plurality of solid lubricant plate crystal particles having a lamellar crystal structure in which the (001) planes are stacked in parallel are adhered freely without using a resin binder,
   wherein further by sliding this medium for adhesion, to which the plurality of the solid lubricant plate crystal particles have been adhered freely, on the surface of the base material without using a resin binder while applying a pressure to the surface of the base material, the solid lubricant plate crystal particles are adhered to the surface of the base material while being rubbed, so that the (001) planes of the solid lubricant plate crystal particles are in parallel with the surface of the base material, whereby these serve as first solid lubricant plate crystal particles, and
   wherein further by sliding the medium for adhesion on the surface of the solid lubricant plate crystal particles without using a resin binder while applying a pressure to the surface of the solid lubricant plate crystal particles which have been adhered to the surface of the base material, the solid lubricant plate crystal particles are adhered and laminated onto the surface of the first solid lubricant plate crystal particles while being rubbed, so that the (001) planes of the solid lubricant plate crystal particles which are to be newly adhered are substantially in parallel with the (001) plane of the first solid lubricant plate crystal particles which have been adhered earlier, whereby this serves as a second solid lubricant plate crystal particle, and wherein further by sliding the medium for adhesion on the surface of (m−1)th solid lubricant plate crystal particles (where, m is an integer of 3 or more) without using a resin binder while applying a pressure to the surface of the (m−1)th solid lubricant plate crystal particles which have been adhered to (m−2)th solid lubricant plate crystal particles, the solid lubricant plate crystal particles are adhered and laminated onto the surface of the (m−1)th solid lubricant plate crystal particles while being rubbed, so that the (001) planes of the solid lubricant plate crystal particles which are to be newly adhered are substantially in parallel with the (001) plane of the (m−1)th solid lubricant plate crystal particles which has been adhered earlier, whereby these serve as m-th solid lubricant plate crystal particles.

(14) The method for forming a coating layer of a sliding member according to (12) or (13), wherein in the sliding member, the shape of the base material is plate-like, cylindrical, or semi-cylindrical, wherein the medium for adhesion is composed of a flexible member and one end thereof is fixed to a rotatable core body, wherein by rotating the core body in the vicinity of the surface of the base material, other end of the medium for adhesion, to which a plurality of solid lubricant plate crystal particles are adhered freely, slides on the surface of the base material while applying a pressure onto the surface of the base material by way of centrifugal force, and wherein further by rotating the core body, other end of the medium for adhesion slides on the surface of the solid lubricant plate crystal particles while applying a pressure onto the surface of the solid lubricant plate crystal particles which have been adhered earlier by way of centrifugal force.

(15) The method for forming a coating layer of a sliding member according to any one of (12) to (14), wherein in the sliding member, the shape of the base material is cylindrical, or semi-cylindrical, and wherein the medium for adhesion is composed of a flexible member and one end thereof is fixed to a rotatable core body, wherein by rotating the core body inside the base material, other end of the medium for adhesion, to which a plurality of solid lubricant plate crystal particles have been adhered freely, slides on the surface of the base material while applying a pressure onto the surface of the base material by way of centrifugal force, and wherein further by rotating the core body, other end of the medium for adhesion slides on the surface of the solid lubricant plate crystal particles while applying a pressure onto the surface of the solid lubricant plate crystal particles which have been adhered earlier by way of centrifugal force.

(16) The method for forming a coating layer of a sliding member according to (14) or (15), wherein the medium for adhesion composed of a flexible member is either one of cloth, non-woven fabric, paper, leather, plastics, and fiber-shaped metal, or a combination thereof, and wherein the surface sliding velocity of other end of the medium for adhesion is 5 m/s or more.

BRIEF DESCRIPTION OF THE DRAWINGS

FIGS. 10A and 10B are graphs showing a result of an X-ray diffraction intensity test of the coating layer of a comparative example which is adhered to the surface of a base material.

REFERENCE NUMERALS

Figure 1:
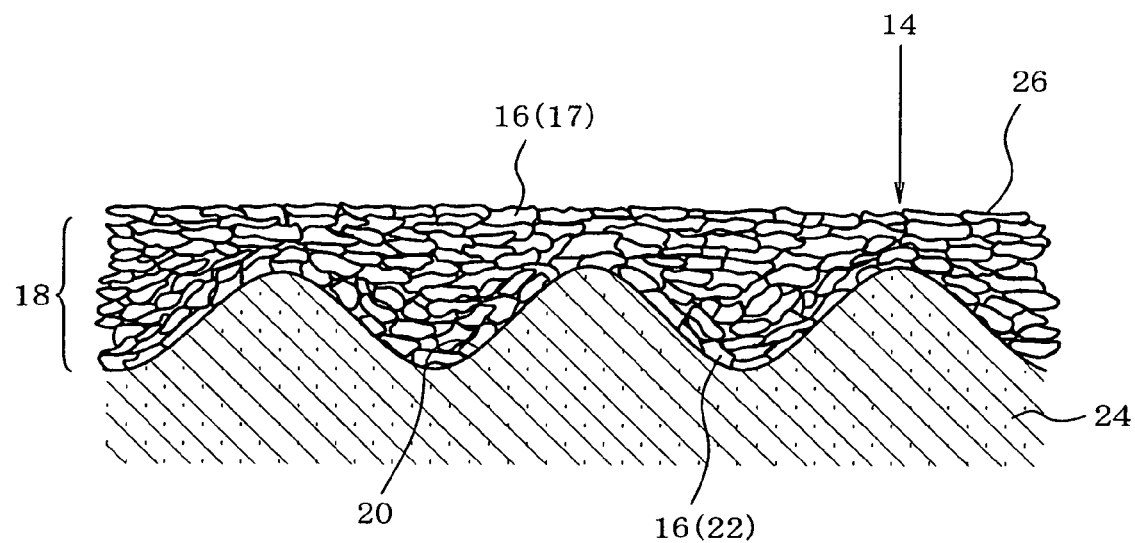
FIG. 1 is a conceptual view showing, in cross section, a state where solid lubricant plate crystal particles are adhered to the surface of a base material.

In the accompanying drawings, reference numeral 1 represents a slide bearing (sliding member), reference numeral 2 represents a back metal layer, reference numeral 3 represents a bearing alloy layer (base material), reference numeral 4 represents a coating layer, reference numeral 5 represents an adhering device, reference numeral 6 represents a body of rotation (core body), reference numeral 7 represents a medium for adhesion, reference numeral 16 represents a solid lubricant plate crystal particle, reference numeral 18 represents a coating layer, reference numeral 20 represents a groove (concave portion), and reference numeral 24 represents a base material.

DETAILED DESCRIPTION OF THE INVENTION

The present invention is explained below in detail with reference to the accompanied drawings.

1. Sliding Member According to the Present Invention

<Structure as a Prerequisite for the Present Invention>

The present invention is targeted for a sliding member having a structure in which a coating layer with a sliding surface is adhered to the surface of a base material.

Figure 8:
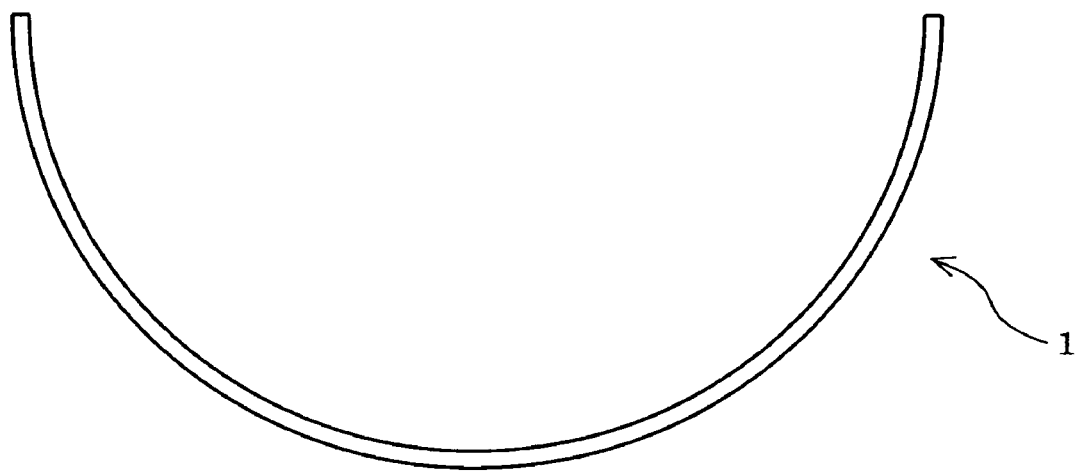
FIG. 8 is a side view of a slide bearing.
Figure 9:
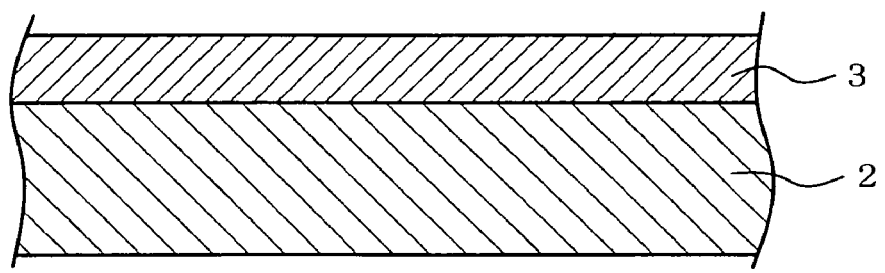
FIG. 9 is a partial cross sectional view of the sliding member before forming a coating layer.

Although FIG. 8 shows a sliding member (slide bearing) 1 used for a radial bearing by way of example, this sliding member 1 used for a radial bearing is formed semi-cylindrically or cylindrically (not shown). As the structure before forming a coating layer of this sliding member used for a radial bearing, as illustrate in FIG. 9, the one with a bilayer structure in which a bearing alloy layer 3 is formed on a back metal layer 2, and the one with a multilayer structure in which an overlay layer is further formed in the surface of the bearing alloy layer 3 of FIG. 9 are often used, however, the one with one layer structure of only a bearing alloy layer may be used. The sliding member used for a thrust bearing just needs to be plate shaped, and the structure thereof includes one layer structure, a bilayer structure, and a multilayer structure, like the ones used for radial bearings. Then, in the ones with one layer structure and a bilayer structure, the bearing alloy layer corresponds to the base material, and in the one with a multilayer structure the overlay layer corresponds to the base material.

Moreover, the present invention can be applied also to sliding members not having a bearing alloy layer, i.e., in FIG. 9, to a sliding member formed of only a member corresponding to the back metal layer 2, and in this case the member corresponding to the back metal layer serves as the base material. This member corresponding to the back metal layer is not limited to be metallic, and may be made of resin.

The sliding member addressed by the present invention has a coating layer adhered to the surface of the base material. Accordingly, the counter member slides on the surface of this coating layer. The surface of the coating layer on which the counter member slides is referred to as the sliding surface.

<Characteristic Structure of a Sliding Member of the Present Invention>

According to a first aspect of the present invention, there is provided a sliding member with a structure described above (a structure in which a coating layer having a sliding surface is adhered to the surface of a base material), wherein the coating layer does not contain a resin binder but has a solid lubricant plate crystal particle laminated therein, wherein the solid lubricant plate crystal particle has a lamellar crystal structure in which (001) planes are stacked in parallel, and wherein at least in the sliding surface, the orientation index of the (001) plane of the solid lubricant plate crystal particle is 90% or more (embodiment (1)).

In the present invention, the coating layer is formed by laminating the solid lubricant plate crystal particle in the surface of the base material. As the solid lubricant plate crystal particle, any one or more kinds among plate crystal particles of molybdenum disulfide, of graphite, of tungsten disulfide, and of boron nitride can be used (embodiment (10)). These solid lubricant plate crystal particles are of a hexagonal crystal.

In this specification, the crystal form is designated by Miller index (hkl), and the orientation index of the (001) crystal plane is defined as equation (1). Here, l is an integer of one or more.

$$\text{Orientation index (\%) of (001) plane} = \Sigma R(001)/\Sigma R(hkl) \times 100 \qquad (1)$$

Where, R(001) means the X-ray intensity of the (001) plane, $\Sigma R$ (001) is a sum of the detected X-ray intensity of the (001) plane, and $\Sigma R$ (hkl) is a total sum of the X-ray intensity of (hkl) planes, i.e., all the detected planes.

As the orientation index is closer to 100%, there are more crystal planes which are orientated to the (001) plane.

In addition, in the sliding surface of the coating layer of the present invention, only a peak of the crystal plane of the (001) plane, such as the (002) plane and (004) plane, is substantially seen. On the other hand, in the sliding surface of coating layers which are different from the present invention, peaks of crystal planes (e.g., the (101) plane, (102) plane, (103) plane, or the like) other than the (001) plane, are also detected.

Figure 4:
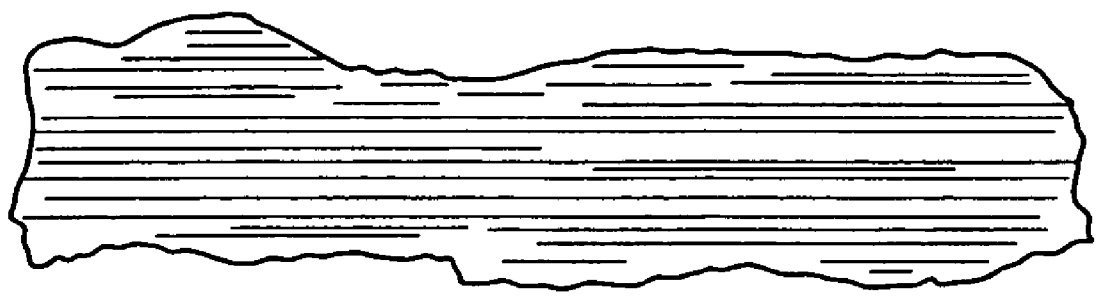
FIG. 4 is a conceptual view showing, in cross section, a laminating state of plate crystal of solid lubricant plate crystal particles.
Figure 5:
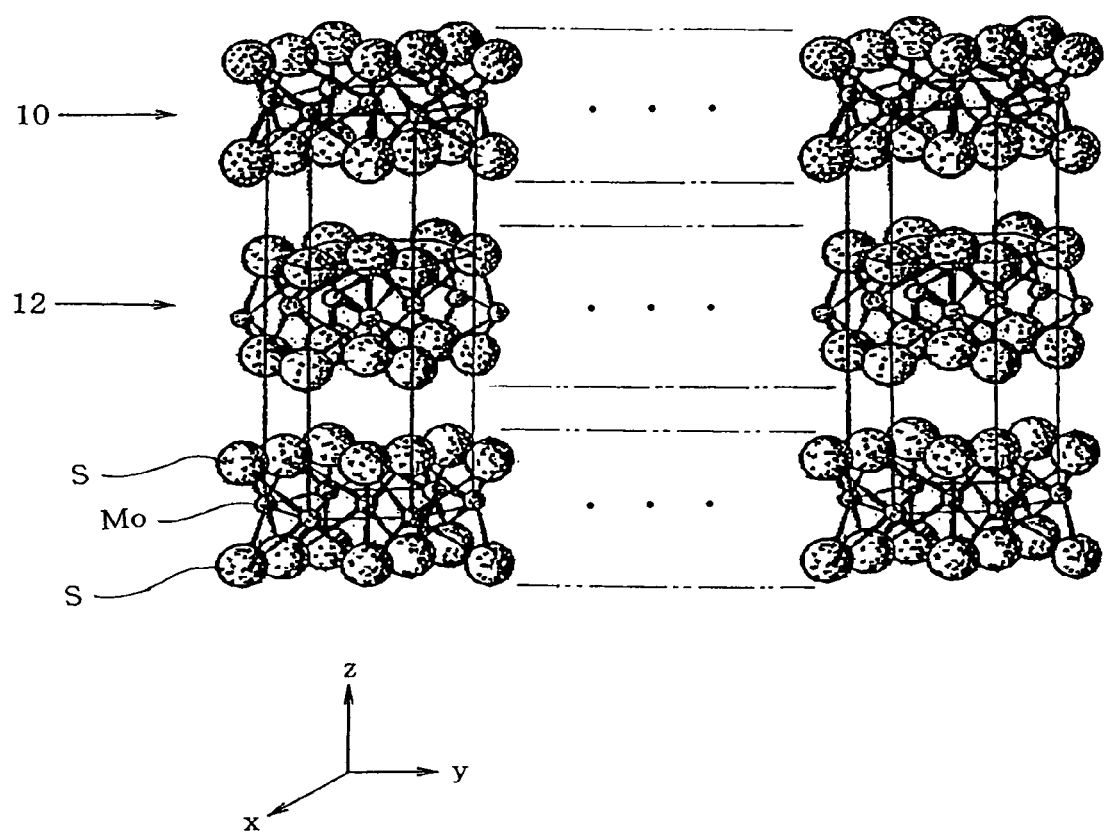
FIG. 5 is a view showing the crystal structure of molybdenum disulfide.

Then, the above-described solid lubricant plate crystal particle has a lamellar crystal structure in which the layers in the particles are stacked with the (001) planes being parallel to each other, and as a whole, as shown in FIG. 4, they have its appearance in the shape of a relatively thin plate. In the following description, an interface between layers of these plate crystal particles is refers to as an interlayer plane. The interlayer plane is in parallel with the (001) plane.

The solid lubricant plate crystal particle which is the construction material of the coating layer is adhered while being forced and rubbed against the surface of the base material, by employing a manufacturing method as described later. Then, because this friction with the surface of the base material produces a chemical reaction field and causes a tribo-chemical reaction, the solid lubricant plate crystal particles are bonded to the base material by a force which is stronger than a van der Waals force bonding between layers of the plate crystal.

In the present invention, at least in the sliding surface, the orientation index of the (001) plane of the solid lubricant plate crystal particle is 90% or more. Then, the coating layer with a high orientation index of the (001) plane tends to have more particles whose (001) planes are stacked in parallel with the sliding direction.

On the other hand, when the counter member comes in contact with the sliding surface and moves under starved lubricant conditions, the solid lubricant plate crystal particles on the sliding surface will transfer to the counter member, and along with this movement of the counter member, a shearing force will be produced in the solid lubricant plate crystal particles.

When a shearing force acts on the solid lubricant plate crystal particles, a slide (interlayer slide) will occur on the interlayer plane in the solid lubricant plate crystal particles, the interlayer plane being in parallel with the moving direction of the counter member. At this time, because only an extremely weak van der Waals force is acting between layers of the plate crystal, an interlayer slide will occur easily by an extremely small shearing force. As a result, the counter member undergoes only an extremely weak friction resistance and slides smoothly even under boundary lubricant conditions.

From the above, in the sliding member of the present invention, because the solid lubricant plate crystal particles which form the coating layer are adhered without using a resin binder, the coating layer has a good heat conduction and is excellent in the foreign substance embedding property and in the compatibility, and also because the counter member slides smoothly and with low friction even under boundary lubricant conditions, the heat generation involved in the sliding is essentially small and thus the sliding member exhibits, in general, an excellent anti-seizure property.

<Area in which the Orientation Index is Set to 90% or More>

In order to obtain an excellent anti-seizure property, the solid lubricant plate crystal particles need to start the interlayer slide along the slide of the counter member. In order to start the interlayer slide, as described above, at least the orientation index of the (001) plane of the solid lubricant plate crystal particle in the sliding surface just needs to be 90% or more so as to increase the number of particles whose (001) planes are stacked in parallel with the sliding direction (embodiment (1)).

It is more preferable that in addition to in the sliding surface, in a predetermined area which has a thickness of 10% or more of the thickness of the thinnest portion of the coating layer, the orientation index of the (001) plane of the solid lubricant plate crystal particle be 90% or more (embodiment (2)).

Here, the thinnest portion of the coating layer refers to the area having the shortest distance in the thickness direction of the coating layer between the sliding surface and the surface of the base material (see reference numeral 14 in FIG. 1). Moreover, the predetermined area may exist anywhere between the sliding surface of the coating layer and the surface of the base material. It is preferable that in the predetermined area, the plane at the sliding surface side and the plane at the surface side of the base material be in parallel with the sliding direction (sliding surface) of the counter member, and that the thickness (the shortest distance in the thickness direction of the coating layer between the plane at the sliding surface side and the plane at the surface side of the base material) be 10% or more of the thinnest portion of the coating layer described above. It is more preferable for the interlayer slide that the location in which the orientation index of the (001) plane is 90% or more be from the sliding surface to the depth of the amount of thickness of the thinnest portion of the coating layer (embodiment (3)).

In either way, in order to cause an interlayer slide effective for a low friction characteristic, the thickness of the coating layer just needs to be 0.1 μm or more in the thinnest portion of the coating layer (embodiment (9)). For example, the thickness of one layer of molybdenum disulfide is extremely thin and on the order of approximately 6 Å, and with several layers or so of this layer, an interlayer slide effective for a low friction characteristic will occur satisfactorily.

<Forming of Concave Portions in the Surface of the Base Material>

For example, in the slide bearing used for a cylindrical or semi-cylindrical engine, the surface of a bearing alloy layer (base material) undergoes boring machining as the surface finish machining. Then, in the surface of the bearing alloy layer, grooves (concave portions) are formed at intervals (periodically) in the shaft direction by this boring machining, the grooves being in parallel with or having a gradient to the rotational direction (the sliding direction) of the opposite shaft. Moreover, if broaching machining is employed as the surface finish machining, in the surface of the bearing alloy layer, grooves along the shaft direction, which is the moving direction of the broach, may be formed, though not periodic. In this manner, the concave portions are often formed in the surface of the base material of the sliding member.

In the present invention, when a concave portion is formed in the surface of the base material, the solid lubricant plate crystal particles are present also in this concave portion, and the orientation index of the (001) plane of the solid lubricant plate crystal particles contacting with this concave portion is set to 90% or more (embodiment (6)).

Because the solid lubricant plate crystal particles are thus present in the concave portion formed in the surface of the base material, the solid lubricant plate crystal particles in this concave portion are supplied to the sliding surface when the thickness of the coating layer has become thin by friction, and thereby a low friction characteristic which is stable over a long period of time can be achieved. Moreover, by setting the orientation index of the interlayer plane of the solid lubricant plate crystal particles contacting with the concave portion to 90% or more, the concave portion and the solid lubricous plate crystal particles contacting with the surface of the concave portion are bonded to each other by a tribo-chemical reaction, with a force stronger than the van der Waals force bonding the layers in the plate crystal particles. Accordingly, an interlayer slide will occur easily in the solid lubricant plate crystal particles which stack thereon.

It is preferable that the above concave portion be a groove having a gradient of 30° or less in the sliding direction (embodiment (7)). If the groove is in parallel with the sliding direction or has a gradient of 30° or less in the sliding direction, the solid lubricant plate crystal particles in the groove are supplied easily to the sliding surface due to the sliding of the counter member.

Moreover, it is preferable that the above concave portion be a groove which has periodicity in the direction perpendicular to the sliding direction and has a gradient of 30° or less in the sliding direction (embodiment (8)). That is, the groove having a gradient of 30° or less described above has periodicity in the direction perpendicular to the sliding direction. With a groove having such periodicity, the solid lubricant plate crystal particles in the groove can be supplied uniformly to the entire sliding surface.

In the present invention, it is preferable that in the coating layer, the (001) plane vary its direction gradually from the direction parallel to the surface of the base material to the direction parallel to the sliding surface, from the surface of the base material to the sliding surface in the thickness direction of the coating layer, and that the orientation index of the (001) plane of the solid lubricant plate crystal particle in the sliding surface and of the solid lubricant plate crystal particle adhered to the surface of the base material be 90% or more (embodiment (4)).

This structure is described by applying to a sliding member shown in FIG. 1. In FIG. 1, a groove (concave portion) 20 is formed periodically in a base material 24. To this base material 24, a coating layer 18 which is formed by laminating a solid lubricant plate crystal particle 16 is adhered. The solid lubricant plate crystal particle 16 forming the coating layer 18 is also present in the groove 20 and orientated so that the orientation index of the (001) plane of a solid lubricant plate crystal particle 22 present in contact with the plane in the groove 20 is 90% or more. Moreover, a solid lubricant plate crystal particle 17 in a sliding surface 26 is orientated so that the orientation index of the (001) plane thereof is 90% or more. Then, the respective (001) planes of the solid lubricant plate crystal particles 16 forming the coating layer 18 gradually vary the direction, from the plane in the groove 20 to the sliding surface 26, as to be in the direction parallel to the sliding surface, from in the direction parallel to the plane in the groove 20.

With such structure, the solid lubricant plate crystal particles 16 are laminated closely in the coating layer 18, and a state is brought about in which the solid lubricant plate crystal particles 16 easily cause an interlayer slide.

In the above, the orientation index is preferably 95 to 100% (embodiment (5)). With such a high orientation rate, the solid lubricant plate crystal particles cause an interlayer slide more easily.

<Application Object of the Present Invention>

The sliding member of the present invention is not limited to the ones in which the shape of the base material is plate-like. It is preferable that the sliding member of the present invention be applied to a sliding member, in which the shape of the base material is cylindrical or semi-cylindrical, and the coating layer is adhered to the inner surface of this base material, and this inner surface of the coating layer is the sliding surface, i.e., the sliding member used for radial bearings, (slide bearing) (embodiment (11))

In case of such sliding member, by employing boring machining as the surface finish machining of the base material, a periodic groove having a gradient of 30° or less in the sliding direction (circumferential direction) can be formed in the surface of the base material.

2. Method for Manufacturing a Sliding Member According to the Present Invention

The coating layer of the sliding member of the present invention is formed by the following methods. Namely, a first one is a method for forming a coating layer of a sliding member, the method for adhering the coating layer having a sliding surface to the surface of a base material, wherein to a medium for adhesion, a plurality of solid lubricant plate crystal particles with a lamellar crystal structure in which the (001) planes are stacked in parallel are adhered freely without using a resin binder, wherein by sliding this medium for adhesion, to which the plurality of the solid lubricant plate crystal particles have been adhered freely, on the surface of the base material without using a resin binder while applying a pressure to the surface of the base material, the solid lubricant plate crystal particles are adhered to the surface of the base material while being rubbed, and further by sliding the medium for adhesion on the surface of the solid lubricant plate crystal particles without using a resin binder while applying a pressure to the surface of the solid lubricant plate crystal particles which have been adhered to the surface of the base material, the solid lubricant plate crystal particles are adhered and laminated further onto the surface of this solid lubricant plate crystal particles while being rubbed (embodiment (12)).

In addition, "being adhered freely" refers to a state where an object, which is a free adhering body, can separate easily from a free adhered body. Here, the solid lubricant plate crystal particles can easily separate from the medium for adhesion.

A second one is a method for forming a coating layer of a sliding member, the method for adhering the coating layer having a sliding surface to the surface of a base material, wherein to an medium for adhesion, a plurality of solid lubricant plate crystal particles with a lamellar crystal structure in which the (001) planes are stacked in parallel are adhered freely without using a resin binder. By sliding this medium for adhesion, to which the plurality of the solid lubricant plate crystal particles have been adhered freely, on the surface of the base material without using a resin binder while applying a pressure to the surface of the base material, the solid lubricant plate crystal particles are adhered to the surface of the base material while being rubbed, so that the (001) planes of the solid lubricant plate crystal particles are in parallel with the surface of the base material, whereby these serve as first solid lubricant plate crystal particles. Further, by sliding the medium for adhesion on the surface of the first solid lubricant plate crystal particles without using a resin binder while applying a pressure to the surface of the first solid lubricant plate crystal particles which have been adhered to the surface of the base material, the solid lubricant plate crystal particles are adhered and laminated onto the surface of the first solid lubricant plate crystal particles while being rubbed, so that the (001) planes of solid lubricant plate crystal particles which are to be newly adhered are substantially parallel with the (001) plane of the first solid lubricant plate crystal particles which are adhered earlier, whereby these serve as second solid lubricant plate crystal particles. Further, by sliding the medium for adhesion on the surface of (m−1)th solid lubricant plate crystal particles (where, m is an integer of 3 or more) without using a resin binder while applying a pressure to the surface of the (m−1)th solid lubricant plate crystal particles which have been adhered to a (m−2)th solid lubricant plate crystal particles, the solid lubricant plate crystal particles are adhered and laminated onto the surface of the (m−1)th solid lubricant plate crystal particles while being rubbed, so that the (001) plane of the solid lubricant plate crystal particles which are to be newly adhered is substantially parallel to the (001) plane of the (m−1)th solid lubricant plate crystal particles which are adhered earlier, whereby these serves as m-th solid lubricant plate crystal particles (embodiment (13)).

According to these first and second manufacturing methods, when sliding the medium for adhesion, to which a plurality of solid lubricant plate crystal particles are adhered freely, while applying a pressure to the surface of the base material, the solid lubricant plate crystal particles will roll on the surface of the base material while rubbing. At this time, the solid lubricant plate crystal particles move while aligning because they are plate-like (see FIG. 4) as described above, and aligns so that the (001) plane is orientated in parallel with the surface of the base material on which surface the strongest frictional force acts, and the solid lubricant plate crystal particles cause a tribo-chemical reaction in the field contacting with the surface of the base material, and adheres to the surface of the base material.

At this time, as shown in FIG. 1, when the concave portion 20 is formed in advance in the surface of the base material 24, the solid lubricant plate crystal particle 16 is orientated and adhered so that the (001) plane becomes parallel with the plane in the concave portion 20. The solid lubricant plate crystal particles 22 which have been adhered to the surface of the base material in this manner are referred to as the first solid lubricant plate crystal particles in the second method described above.

Furthermore, when sliding the medium for adhesion, to which the solid lubricant plate crystal particles are adhered freely, while applying a pressure to the solid lubricant plate crystal particles 22 which have been adhered to the surface of the base material, because the coefficient of friction between the surface of the base material having roughness and the solid lubricant plate crystal particle 22 adhered to the surface of the base material is larger than the coefficient of friction between the solid lubricant plate crystal particle 22 adhered to the surface of the base material and the solid lubricant plate crystal particle 16 which is caused to be slid thereon, another solid lubricant plate crystal particle 16 is to move on top of the solid lubricant plate crystal particle 22 adhered to the surface of the base material while rubbing. Due to this movement, on the solid lubricant plate crystal particles of the surface of the base material, another solid lubricant plate crystal particle moves on the interlayer plane as to be orientated in parallel with the interlayer plane of the lower solid lubricant plate crystal particle.

Figure 2:
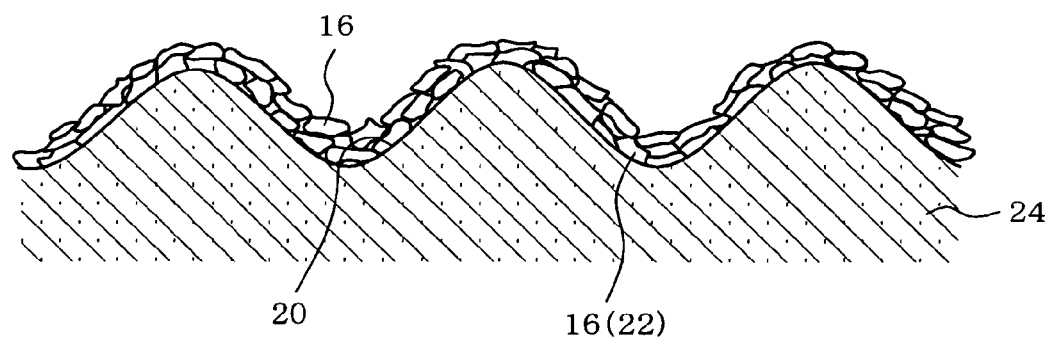
FIG. 2 is a conceptual view showing, in cross section, a state in the course of adhering the solid lubricant plate crystal particles to the surface of the base material.

At this time, when the concave portion 20 is formed in advance in the surface of the base material 24, more solid lubricant plate crystal particles 16 come into the concave portion 20, as shown in FIG. 2, and are orientated and laminated sequentially so that the (001) plane becomes substantially in parallel with the lower solid lubricant plate crystal particle. The solid lubricant plate crystal particles, which have been adhered on top of the solid lubricant plate crystal particles adhered to the surface of the base material, including those adhered in the concave portion, are referred to as the second solid lubricant plate crystal particles in the second method described above.

Then, when the solid lubricant plate crystal particles 16 come into the concave portion 20 and the concave portion 20 is thus filled with the solid lubricant plate crystal particles 16, in the entire base material 24 the solid lubricant plate crystal particles 16 are laminated sequentially on top of the lower solid lubricant plate crystal particle 16, and finally, as shown in FIG. 1, in the surface of the base material 24 the coating layer 18, whose surface becomes flat because the solid lubricant plate crystal particles 16 have been laminated, is formed. In the second method described above, the solid lubricant plate crystal particles adhered on top of the second solid lubricant plate crystal particles are the third solid lubricant plate crystal particles, namely, all the solid lubricant plate crystal particles to be laminated onto the solid lubricant plate crystal particle adhered on the solid lubricant plate crystal particle are referred to as the m-th solid lubricant plate crystal particles. These m-th solid lubricant plate crystal particles are not limited to the ones to be laminated into one layer, but may be laminated into multi-layers.

As described above, while the solid lubricant plate crystal particle moves while rolling on the surface of the base material by friction work by the medium for adhesion, the solid lubricant plate crystal particle aligns the (001) plane as to be in parallel with the (001) plane of the solid lubricant plate crystal particle adhered to the surface of the base material or of the solid lubricant plate crystal particle adhered thereon, and is laminated to thereby form the coating layer.

In the case where the shape of the base material of the sliding member is plate-like, cylindrical, or semi-cylindrical, the medium for adhesion is formed of a flexible member, and by fixing one end thereof to a rotatable core body and rotating the core body in the vicinity of the surface of the base material, other end of the medium for adhesion to which a plurality of solid lubricant plate crystal particles are adhered freely can slide on the surface of the base material while applying a pressure onto the surface of the base material by way of centrifugal force, and further by rotating the core body, other end of the medium for adhesion can slide on the surface of this solid lubricant plate crystal particle while applying a pressure onto the surface of the solid lubricant plate crystal particle which has been adhered earlier by way of centrifugal force (embodiment (14)).

In the case where the shape of the base material of the sliding member is cylindrical or semi-cylindrical, the medium for adhesion is formed of a flexible member, and by fixing one end thereof to a rotatable core body and rotating the core body inside the base material, other end of the medium for adhesion to which a plurality of solid lubricant plate crystal particles are adhered freely can slide on the surface of the base material while applying a pressure onto the surface of the base material by way of centrifugal force, and further by rotating the core body, other end of the medium for adhesion can slide on the surface of the solid lubricant plate crystal particles while applying a pressure onto the surface of the solid lubricant plate crystal particle which has been adhered earlier by way of centrifugal force (embodiment (15)).

In this case, it is preferable that the medium for adhesion composed of a flexible member be either one of cloth, non-woven fabric, paper, leather, plastics, and fiber-shaped metal, or a combination thereof, and that the surface sliding velocity of other end of the medium for adhesion be 5 m/s or more (embodiment (16)).

In addition, in this specification, "parallel" may include not only a case of being precisely parallel but also a case of having a gradient in ranges where it has the action, effect, and function similar to those of the parallel state.

DESCRIPTION OF PREFERRED EMBODIMENT

Figure 6:
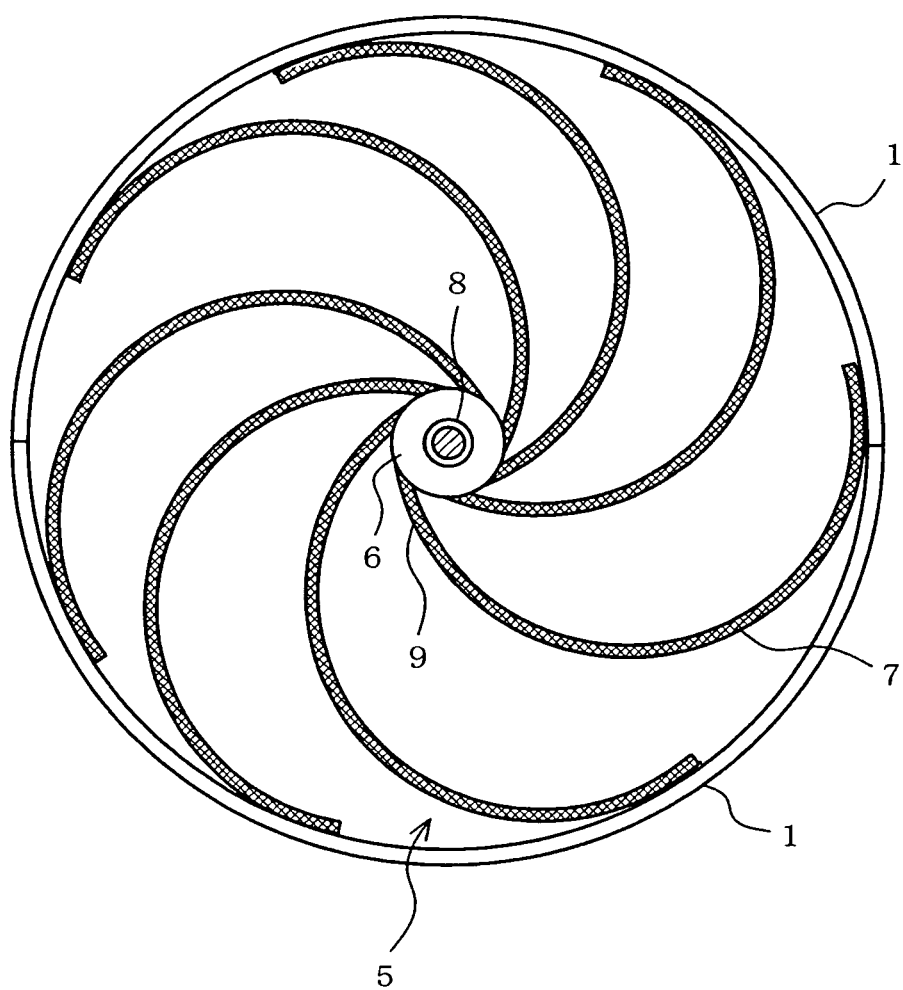
FIG. 6 is a cross sectional view of an adhering device showing an embodiment of the present invention.
Figure 7:
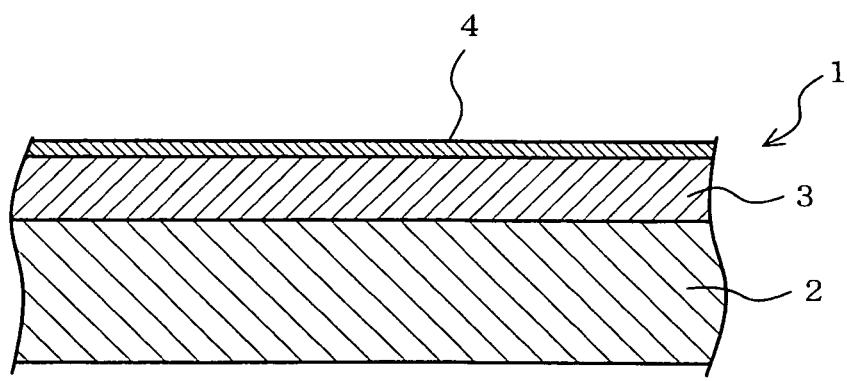
FIG. 7 is a partial cross sectional view of a slide bearing to which a coating layer is adhered.

Hereinafter, an embodiment in which the present invention is applied to a sliding member used for a radial bearing (hereinafter, simply referred to as a slide bearing) 1 is described with reference to FIG. 6 and FIG. 7. As shown in FIG. 6, the slide bearing 1 is formed in the shape of a semi-circular cylinder. As shown in FIG. 7, this slide bearing 1 is formed by lining a bearing alloy layer 3 onto the inner surface of a back metal layer 2, and further by forming a coating layer 4 in the surface of the bearing alloy layer (base material) 3.

This slide bearing 1 is formed by forming a bimetal in the shape of a semi-circular cylinder as shown in FIG. 8, the bimetal having been formed by lining the bearing alloy layer 3 onto the back metal layer 2 as shown in FIG. 9, and then by adhering the coating layer 4 to the surface of the bearing alloy layer (base material) 3 after finish machining the surface of the bearing alloy layer 3 by boring machining, the surface of the bearing alloy layer 3 being the inner surface.

The coating layer 4 is composed of a solid lubricant plate crystal particle, which has been laminated in the surface of the bearing alloy layer 3 without using a resin binder. As the solid lubricant plate crystal particle, any one or more kinds among the plate crystal particles of molybdenum disulfide, of graphite, of tungsten disulfide, and of boron nitride are selected to use.

An adhering device 5 for laminating solid lubricant plate crystal particles to the surface of the bearing alloy layer 3 is configured as shown in FIG. 6 by fixing one end side 9 of a plurality of medium for adhesions 7 to a body of rotation 6 as the core body, which is detachably attached to a rotating shaft 8. The medium for adhesion 7 is composed of a flexible member, such as cloth, non-woven fabric, paper, leather, plastics, and fiber-like metal, and is here formed in the form of a circular plate having a width slightly wider than the width of the slide bearing 1. As for the medium for adhesion 7, a member having unevenness or the like in the surface thereof and a large surface area is preferable. This is because a plenty of solid lubricant plate crystal particles can be adhered freely to the medium for adhesion 7 at once.

In order to form the coating layer 4 in the inner surface of the slide bearing 1 by means of the adhering device 5, first, two slide bearings 1 are confronted to each other in the shape of a cylinder and fixed to a jig (not shown) as to be concentric to the rotating shaft 8. Then, to the plurality of medium for adhesions 7 fixed to the body of rotation 6, a plenty of solid lubricant plate crystal particles with a lamellar crystal structure in which the (001) planes are stacked in parallel (e.g., molybdenum disulfide particles) are adhered freely, and the body of rotation 6 is attached to the rotating shaft 8 as to house these medium for adhesions 7 in the two slide bearings 1, which are confronted to each other in the shape of a cylinder.

Then, the rotating shaft 8 is rotated by a non-illustrated motor. Then, a tip, which is other end of the medium for adhesion 7, undergoes a centrifugal force involved in the rotation and rotates as if sliding while pressure contacting to the inner surface of the bearing alloy layer 3 which is the inner surface of the slide bearing 1. The sliding velocity in the surface of the bearing alloy layer 3 of the medium for adhesion 7 at this time is preferably 5 m/s or more. Due to the rotation of the medium for adhesion 7, the molybdenum disulfide particles freely adhered to the medium for adhesion 7 move by friction while applying a pressure to the surface of the bearing alloy layer 3, and accordingly, the molybdenum disulfide particles orientate the interlayer plane as to be in parallel with the surface of the bearing alloy layer 3 (because the (001) plane, which is the largest plane, being in parallel with the moving direction is stable), and it then causes a tribo-chemical reaction to adhere to the surface of the bearing alloy layer 3. Then, further, with the rotation of the medium for adhesion 7, another molybdenum disulfide particle is orientated on top of the molybdenum disulfide particles adhered to the surface of the bearing alloy layer 3 so that the (001) plane (interlayer plane) becomes substantially in parallel with the (001) plane of the lower molybdenum disulfide particle, and thus laminated sequentially. In this manner, the molybdenum disulfide layer is formed on the bearing alloy layer 3, and at the time when the thickness thereof becomes a desired thickness of 0.1 μm or more this adhering process is finished. In addition, the operating time of this adhering process is determined suitably corresponding to a desired thickness of the coating layer 4.

Next, an embodiment of the present invention is described. A bimetal made by lining a bearing alloy layer of the composition shown in Table 1 onto the back metal layer is formed in the shape of a semi-circular cylinder, and the surface of the bearing alloy layer is boring machined.

Thereafter, solid lubricant plate crystal particles are adhered to the inner surface (surface of the base material) of the bearing alloy layer by means of the above-described adhering device 5 to thereby form the coating layer in the surface of the bearing alloy layer and obtain Examples 1 to 10.

Comparative Examples 1 and 2 are prepared by carrying out a curing after coating the surface of the bearing alloy layer with a coating layer, which coating layer is made by mixing the solid lubricant plate crystal particles with a resin binder composed of PAI (polyamide imide) resin. Comparative Examples 3 and 4 are obtained by forming a coating layer composed of solid lubricant plate crystal particles by a method for the colliding solid lubricant plate crystal particles against the surface of the bearing alloy layer by shot peening. Moreover, the samples in which the surface of the bearing alloy layer remains boring machined are Comparative Examples 5 and 6.

In addition, the bearing alloy layer of Examples 1 to 5 and Comparative Examples 1, 3, and 5 is of aluminum alloy, and the bearing alloy layer of Examples 6 to 10 and Comparative Examples 2, 4, and 6 is of copper alloy.

TABLE 1

| Sample | Composition of bearing alloy layer | Coating layer Composition | Thickness (μm) | Orientation index (%) | Test results Seizure pressure (MPa) |
|---|---|---|---|---|---|
| Example 1 | Al—10Sn—3Si—1Cu | $MoS_2$ | 0.5 | 97 | 90 |
| Example 2 | Al—20Sn—1Cu | Graphite | 0.7 | 98 | 85 |
| Example 3 | Al—4Zn—6Si—1Cu | $MoS_2$ | 2.0 | 99 | 95 |
| Example 4 | Al—40Sn—1Cu | Graphite | 1.2 | 97 | 85 |
| Example 5 | Al—6Si—6Sn—1Cu | $MoS_2$ | 1.0 | 95 | 85 |
| Example 6 | Cu—23Pb—3Sn | $MoS_2$ | 1.5 | 97 | 65 |
| Example 7 | Cu—10Pb—10Sn | Graphite | 2.1 | 97 | 65 |
| Example 8 | Cu—6Sn—0.2P | $MoS_2$ | 0.7 | 96 | 60 |
| Example 9 | Cu—6Sn—3Ni | Graphite | 1.0 | 98 | 60 |
| Example 10 | Cu—19Zn—7Bi—3Mn—1Si | $MoS_2$ | 1.0 | 97 | 75 |
| Comparative Example 1 | Al—10Sn—3Si—1Cu | 50 wt % $MoS_2$ + PAI resin | 5.2 | 79 | 80 |
| Comparative Example 2 | Cu—10Pb—10Sn | 50 wt % $MoS_2$ + PAI resin | 5.1 | 76 | 55 |
| Comparative Example 3 | Al—10Sn—3Si—1Cu | $MoS_2$ Shot peening | <0.1 | 87 | 75 |
| Comparative Example 4 | Cu—10Pb—10Sn | $MoS_2$ Shot peening | <0.1 | 86 | 50 |
| Comparative Example 5 | Al—10Sn—3Si—1Cu | untreated | — | — | 70 |
| Comparative Example 6 | Cu—10Pb—10Sn | untreated | — | — | 45 |

Concerning the above Examples 1 to 10 and Comparative Examples 1 to 6, the thickness of the coating layer, and the orientation index of the (001) plane of the solid lubricant plate crystal particle in the surface of the coating layer (sliding surface) were measured, and a seizure test was conducted under the conditions shown in Table 2, and those measurement results and test results are described in Table 1.

TABLE 2

| Conditions | |
|---|---|
| Peripheral speed | 20 m/sec. |
| Test load | Increase by 10 MPa every 10 minutes |
| Lubricating oil | VG22 |
| Oil feeding temperature | 100° C. |

TABLE 2-continued

| Conditions | |
|---|---|
| Oil feeding amount | 150 cc/min |
| Shaft material | S55C |
| Evaluation method | Largest surface temperature not causing seizure |

Figure 3A:
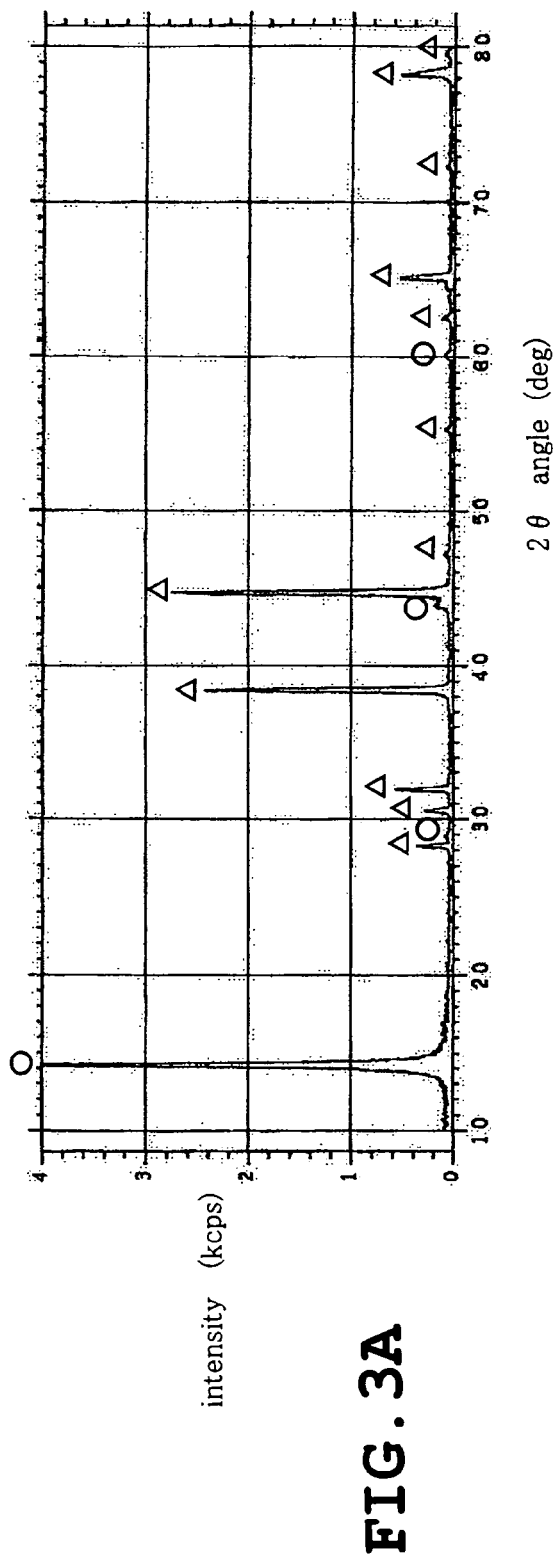
FIG. 3 is a graph which shows a result of an X-ray diffraction intensity test of the coating layer of an example, the coating layer being adhered to the surface of the base material.
Figure 3B:
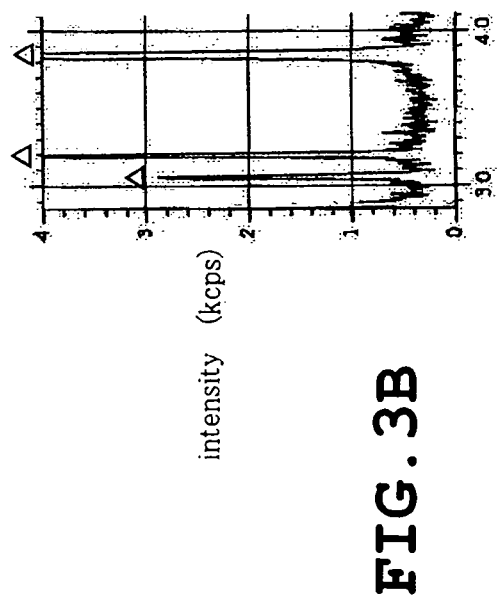

In addition, the orientation index was calculated from the result of an X-ray diffraction intensity test. An example of the measurement result of the X-ray diffraction intensity test of Examples and Comparative Examples is shown in FIGS. 3 (*a*) and (*b*), and FIGS. 10 (*a*) and (*b*), respectively. FIG. 3 (*b*) showing the measurement result of Example 1 is a partially enlarged view of FIG. 3 (*a*), and FIG. 10 (*b*) showing the measurement result of Comparative Example 1 is a partially enlarged view of FIG. 10 (*a*). A mark "○" (circle) in FIGS. 3 (*a*) and (*b*) and FIGS. 10 (*a*) and (*b*) indicates the (001) plane of molybdenum disulfide which is the solid lubricant plate crystal particle, a mark "Δ" (triangle) indicates the crystal plane of an aluminum alloy which is the under layer base material, and a mark "x" (cross) indicates the crystal planes other than the (001) plane of molybdenum disulfide.

As apparent from FIGS. 3 (*a*) and (*b*), the peaks other than the (001) plane of the solid lubricant plate crystal particle are almost not seen in the measurement result of Example. On the other hand, as apparent from FIGS. 10 (*a*) and (*b*), peaks other than the (001) plane of the solid lubricant plate crystal particle are easily seen in the measurement result of Comparative Example. In addition, as shown in FIG. 10 (*b*), in the measurement result of Comparative Example 1, (101), (102) and (103) planes which are other than the (001) plane are identified. The orientation index of Example and Comparative Example calculated from the measurement result of the X-ray diffraction intensity test and the above equation are shown in Table 1.

The result of the seizure test is discussed. As apparent from Table 2, the seizure test is conducted under the conditions that the lubricant is starved by stepping up the load. That is, the higher the surface pressure, the thinner the oil slick is, and it therefore gradually turns into a starved lubricant state. In addition, the seizure pressure refers to the surface pressure of when a seizure occurred in increasing the test load by 10 MPa for every 10 minutes. Moreover, for the evaluation of the seizure, at the time when the back plane temperature of the sample exceeded 200° C. or at the time when the shaft driving belt for rotating the opposite shaft slipped due to the torque fluctuation, it is determined that a seizure occurred.

Because Comparative Examples 5 and 6 did not undergo a treatment for improving lubricity, the seizure surface pressure is low.

In Comparative Examples 3 and 4 in which the solid lubricant plate crystal particles are adhered to the surface of the base material by shot peening, because the solid lubricant plate crystal particle is plate-like, the interlayer plane is very easily to be in parallel with the surface of the base material at the time of colliding with the surface of the base material, and therefore the orientation index is nearly 90%. However, with the shot peening, the solid lubricant plate crystal particles can not be laminated satisfactorily, and the thickness of the coating layer is less than 0.1 μm. For this reason, it is not easy to obtain a sufficient lubricity and the seizure surface pressure is low.

Moreover, in Comparative Examples 1 and 2 made by mixing the solid lubricant plate crystal particles with a resin binder and coating, the coating layer of a desired thickness can be obtained, however, because the heat radiation properties of the resin binder is low, and also because the orientation index of the solid lubricant plate crystal particle is low, a high seizure surface pressure cannot be obtained.

On the other hand, Examples 1 to 10 have a high seizure surface pressure as compared with Comparative Examples 1 to 6, and, for example, if compared with the one whose bearing alloy layer is made of aluminum alloy, even in Example 1 in which the thickness of the coating layer is relatively thin, the seizure surface pressure is 90 MPa, exhibiting a considerably excellent anti-seizure property as compared with 80, 75, and 70 MPa of Comparative Examples 1, 3 and 5 which has used the same bearing metal. The result of the one whose bearing alloy layer is made of copper alloy was also the same. In this way, it is understood that the present invention, in which solid lubricant plate crystal particles are adhered by friction work without using a resin binder, is effective in improving the anti-seizure property.

The invention claimed is:

1. A sliding member in which a coating layer having a sliding surface is adhered to the surface of a base material,
wherein the coating layer does not contain a resin binder but has a solid lubricant plate crystal particle laminated therein,
wherein the solid lubricant plate crystal particle has a lamellar crystal structure in which a (001) plane (where, 1 is an integer of one or more) is stacked in parallel, and
wherein at least in the sliding surface, a predetermined region having a thickness of 10% or more of the thickness of the thinnest portion of the coating layer and the solid lubricant plate crystal particle adhered to the surface of the base material, the orientation index of the (001) plane of the solid lubricant plate crystal particle is 90% or more.

2. The sliding member according to claim 1, wherein in the coating layer, the location in which the orientation index of the (001) plane is 90% or more is from the sliding surface to the depth of the amount of thickness of the thinnest portion of the coating layer.

3. The sliding member according to claim 1, wherein in the coating layer, the (001) plane varies the direction gradually from the direction parallel to the surface of the base material to the direction parallel to the sliding surface, from the surface of the base material to around the sliding surface in the thickness direction of the coating layer, and the orientation index of the (001) plane of the solid lubricant plate crystal particle in the sliding surface is 90% or more.

4. The sliding member according to claims 1, wherein the orientation index is 95 to 100%.

5. The sliding member according to claim 1, wherein in the surface of the base material, a concave portion is formed, and also in this concave portion the solid lubricant plate crystal particle is present, and the orientation index of the (001) plane of the solid lubricant plate crystal particle contacting with this concave portion is 90% or more.

6. The sliding member according to claim 5, wherein the concave portion is a groove with a gradient of 30° or less in the sliding direction.

7. The sliding member according to claim 6, wherein the groove with a gradient of 30° or less in the sliding direction has periodicity in the direction perpendicular to the sliding direction.

8. The sliding member according to claim 1, wherein the coating layer is 0.1 μm or more in the thinnest portion of the coating layer.

9. The sliding member according to claim 1, wherein the solid lubricant plate crystal particle is composed of any one or more kinds among plate crystal particles of molybdenum disulfide, of graphite, of tungsten disulfide, and of boron nitride.

10. The sliding member according to claim 1, wherein the shape of the base material is cylindrical or semi-cylindrical, a coating portion is adhered to the inner surface of the base material, and the inner surface of the coating portion is a sliding surface.

11. A method for forming a coating layer of a sliding member in accordance with claim 1, the method for adhering the coating layer having a sliding surface to the surface of a base material,
wherein to a medium for adhesion, a plurality of solid lubricant plate crystal particles having a lamellar crystal structure in which the (001) planes are stacked in parallel are adhered freely without using a resin binder,
wherein by sliding this medium for adhesion, to which the plurality of the solid lubricant plate crystal particles have been adhered freely, on the surface of the base material without using a resin binder while applying a pressure to the surface of the base material, the solid lubricant plate crystal particles are adhered to the surface of the base material while being rubbed, and
wherein further by sliding the medium for adhesion on the surface of the solid lubricant plate crystal particles without using a resin binder while applying a pressure to the surface of the solid lubricant plate crystal particles which have been adhered to the surface of the base material, the solid lubricant plate crystal particles are further adhered and laminated onto the surface of these solid lubricant plate crystal particles while being rubbed.

12. A method for forming a coating layer of a sliding member in accordance with claim 1, the method for adhering the coating layer having a sliding surface to the surface of a base material,
wherein to a medium for adhesion, a plurality of solid lubricant plate crystal particles having a lamellar crystal structure in which the (001) planes are stacked in parallel are adhered freely without using a resin binder,
wherein further by sliding this medium for adhesion, to which the plurality of the solid lubricant plate crystal particles have been adhered freely, on the surface of the base material without using a resin binder while applying a pressure to the surface of the base material, the solid lubricant plate crystal particles are adhered to the surface of the base material while being rubbed, so that the (001) planes of the solid lubricant plate crystal particles are in parallel with the surface of the base material, whereby these serve as first solid lubricant plate crystal particles, and wherein further by sliding the medium for adhesion on the surface of the solid lubricant plate crystal particles without using a resin binder while applying a pressure to the surface of the solid lubricant plate crystal particles which have been adhered to the surface of the base material, the solid lubricant plate crystal particles are adhered and laminated onto the surface of the first solid lubricant plate crystal particles while being rubbed, so that the (001) planes of the solid lubricant plate crystal particles which are to be newly adhered are substantially in parallel with the (001) plane of the first solid lubricant plate crystal particles which have been adhered earlier, whereby this serves as a second solid lubricant plate crystal particle, and wherein further by sliding the medium for adhesion on the surface of (m−1)th solid lubricant plate crystal particles (where, m is an integer of 3 or more) without using a resin binder while applying a pressure to the surface of the (m−1)th solid lubricant plate crystal particles which have been adhered to (m−2)th solid lubricant plate crystal particles, the solid lubricant plate crystal particles are adhered and laminated onto the surface of the (m−1)th solid lubricant plate crystal particles while being rubbed, so that the (001) planes of the solid lubricant plate crystal particles which are to be newly adhered are substantially in parallel with the (001) plane of the (m−1)th solid lubricant plate crystal particles which has been adhered earlier, whereby these serve as m-th solid lubricant plate crystal particles.

13. The method for forming a coating layer of a sliding member according to claim 11, wherein in the sliding member, the shape of the base material is plate-like, cylindrical, or semi-cylindrical, wherein the medium for adhesion is composed of a flexible member and one end thereof is fixed to a rotatable core body, wherein by rotating the core body in the vicinity of the surface of the base material, other end of the medium for adhesion, to which a plurality of solid lubricant plate crystal particles are adhered freely, slides on the surface of the base material while applying a pressure onto the surface of the base material by way of centrifugal force, and wherein further by rotating the core body, other end of the medium for adhesion slides on the surface of the solid lubricant plate crystal particles while applying a pressure onto the surface of the solid lubricant plate crystal particles which have been adhered earlier by way of centrifugal force.

14. The method for forming a coating layer of a sliding member according to claim 12, wherein in the sliding member, the shape of the base material is plate-like, cylindrical, or semi-cylindrical, wherein the medium for adhesion is composed of a flexible member and one end thereof is fixed to a rotatable core body, wherein by rotating the core body in the vicinity of the surface of the base material, other end of the medium for adhesion, to which a plurality of solid lubricant plate crystal particles are adhered freely, slides on the surface of the base material while applying a pressure onto the surface of the base material by way of centrifugal force, and wherein further by rotating the core body, other end of the medium for adhesion slides on the surface of the solid lubricant plate crystal particles while applying a pressure onto the surface of the solid lubricant plate crystal particles which have been adhered earlier by way of centrifugal force.

15. The method for forming a coating layer of a sliding member according to claim 11, wherein in the sliding member, the shape of the base material is cylindrical, or semi-cylindrical, and wherein the medium for adhesion is composed of a flexible member and one end thereof is fixed to a rotatable core body, wherein by rotating the core body inside the base material, other end of the medium for adhesion, to which a plurality of solid lubricant plate crystal particles have been adhered freely, slides on the surface of the base material while applying a pressure onto the surface of the base material by way of centrifugal force, and wherein further by rotating the core body, other end of the medium for adhesion slides on the surface of the solid lubricant plate crystal particles while applying a pressure onto the surface of the solid lubricant plate crystal particles which have been adhered earlier by way of centrifugal force.

16. The method for forming a coating layer of a sliding member according to claim 12, wherein in the sliding member, the shape of the base material is cylindrical, or semi-cylindrical, and wherein the medium for adhesion is composed of a flexible member and one end thereof is fixed to a rotatable core body, wherein by rotating the core body inside the base material, other end of the medium for adhesion, to which a plurality of solid lubricant plate crystal particles have been adhered freely, slides on the surface of the base material while applying a pressure onto the surface of the base material by way of centrifugal force, and wherein further by rotating the core body, other end of the medium for adhesion slides on the surface of the solid lubricant plate crystal particles while applying a pressure onto the surface of the solid lubricant plate crystal particles which have been adhered earlier by way of centrifugal force.

17. The method for forming a coating layer of a sliding member according to claim 11, wherein the medium for adhesion composed of a flexible member is either one of cloth, non-woven fabric, paper, leather, plastics, and fiber-shaped metal, or a combination thereof, and wherein the surface sliding velocity of other end of the medium for adhesion is 5 m/s or more.

18. The method for forming a coating layer of a sliding member according to claim 12, wherein the medium for adhesion composed of a flexible member is either one of cloth, non-woven fabric, paper, leather, plastics, and fiber-shaped metal, or a combination thereof, and wherein the surface sliding velocity of other end of the medium for adhesion is 5 m/s or more.

* * * * *